J. W. BRENKERT.
VEHICLE SIGNAL APPARATUS.
APPLICATION FILED SEPT. 4, 1919.
1,413,959.
Patented Apr. 25, 1922.
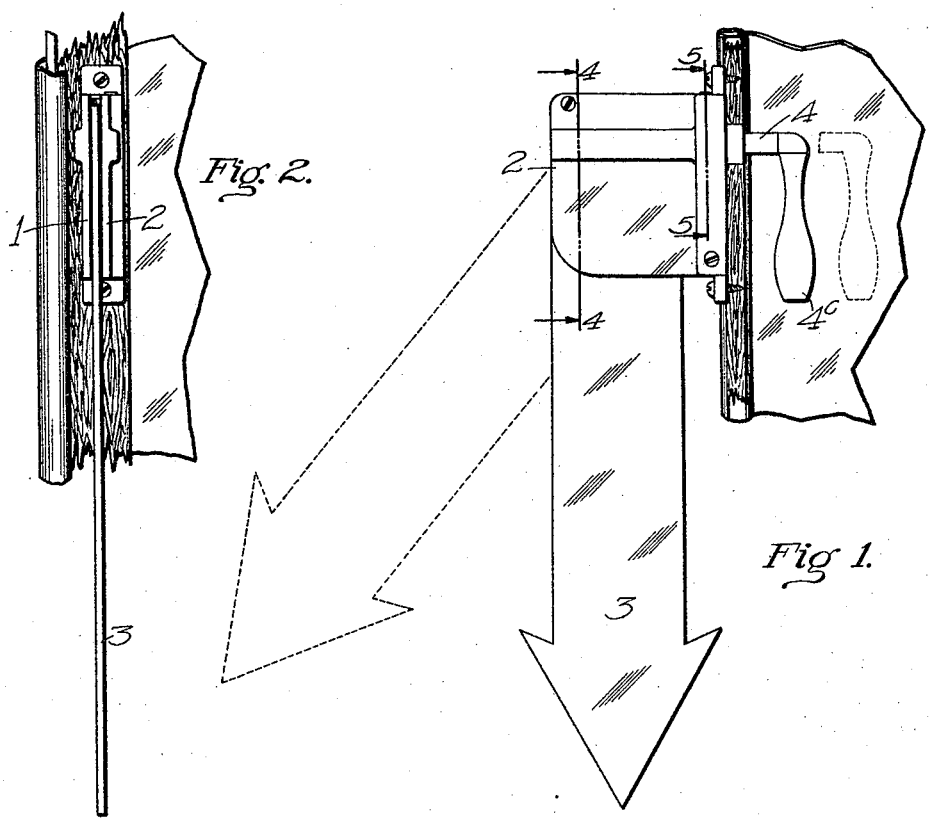
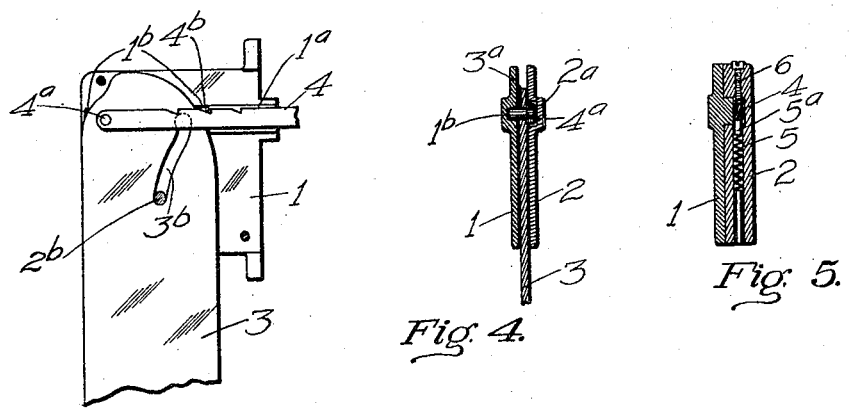
INVENTOR.
JOSEPH W. BRENKERT.
BY A.B. Bowman
ATTORNEYS.

UNITED STATES PATENT OFFICE.

JOSEPH W. BRENKERT, OF SAN DIEGO, CALIFORNIA.

VEHICLE SIGNAL APPARATUS.

1,413,959.

Specification of Letters Patent. Patented Apr. 25, 1922.

Application filed September 4, 1919. Serial No. 321,562.

*To all whom it may concern:*

Be it known that I, JOSEPH W. BRENKERT, a citizen of the United States, residing at San Diego, in the county of San Diego and State of California, have invented a certain new and useful Vehicle Signal Apparatus, of which the following is a specification.

My invention relates to a signalling apparatus for vehicles for indicating the direction or action a vehicle is about to take when moving about the streets and the objects of my invention are: first, to provide an apparatus of this class which may be secured on one side of the vehicle particularly an inclosed top vehicle and operated from the inside for indicating when a vehicle will turn to the right, left, slow-down or stop; second, to provide an apparatus of this class which is applicable for use with either closed top vehicle or an open top; third, to provide an apparatus of this class wherein an arm is moved to various positions and held in such position until actuated by the operator for indicating the direction or action of the vehicle and fourth, to provide an apparatus of this class which is very simple and economical of construction, durable, easy to operate, easy to install and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of my apparatus shown mounted on a vehicle body and showing the arm in neutral position and showing by dotted lines another position which will be termed the slow-down or stop position; Fig. 2 is a side elevational view at a right angle thereto; Fig. 3 is a fragmentary side elevational view similar to that of Fig. 1 with the cover plate removed and showing the arm and its operating parts fragmentarily; Fig. 4 is a sectional view through 4—4 of Fig. 1 and Fig. 5 is a sectional view through 5—5 of Fig. 1.

Similar characters of reference refer to similar parts and portions throughout the several views of the drawings.

The support member 1, cover plate 2, arm 3, operating bar 4, spring 5, and latch screw 6 constitute the principal parts and portions of my vehicle signalling apparatus.

The support 1 is shaped as shown and it is provided with lugs to facilitate the securing of the same to the vehicle body. This support 1 is provided with an offset portion $1^a$ and with a groove $1^b$ and secured to this support 1 is a cover member 2 which is also provided with an offset portion forming a groove $2^a$ registering with the groove $1^b$ in the member 1 and reciprocally mounted in this groove $2^a$ is an operating bar 4 which is provided with a laterally extended pin $4^a$ in its one end which extends into the groove $1^b$ in the member 2 and through a hole in the arm member 3 thus providing a pivotal support for the member 3 on the member 4 which member 4 is also provided with a plurality of notches $4^b$ in its upper surface which are adapted to engage the inner end of the screw 6 when the member 4 is in certain relative position thereto. Mounted in a hole in the member 2 is a spring 5 which supports a small pin $5^a$ and tends to hold said pin against the lower surface of the member 4 so that the notches $4^b$ engage the screw 6. The cover member 2 is provided with an inwardly extending lug 2b which rests in a slot $3^b$ in the arm member 3 which serves as a guide and a support for the arm member 3 when in neutral position as shown best in the drawings.

In operation, the arm 3 when in a vertical position is in neutral position, when moved to the position as shown by dotted lines in Fig. 1 it designates a slow-down or stop; when moved to a horizontal position it designates a turn to the left; when moved upwardly on an angle it designates a turn to the right and it is operated by grasping the handle $4^c$ and pulling on the same moving the arm member 3 up to the position desired, the spring 5 pressing the member 4 so that the notches $4^b$ engage the screw and hold it in position. When it is desired to release the same the handle $4^c$ is grasped and pressed downwardly so that the notches $4^b$ disengage the screw and the handle pushed in, moving the member 3 to the position desired. It will be noted that the two pins $4^a$ and $2^b$ are in such position in the member 3 as to lock the same against movement with the movement or vibration of the vehicle which are readily moved by the handle member $4^c$ to and from the various positions as desired.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

Having thus described my invention what I claim as new and desire to secure by Letters Patent, is:

1. In a vehicle signalling apparatus, a supporting member provided with a horizontal groove therein, a cover member secured thereto with a conforming groove therein, a bar reciprocably mounted in said grooves provided with a plurality of equally spaced notches and with an extended lug on its one end, an arm member pivotally mounted on said lug and supported between said support and said cover member at one of its ends and a latch means for holding said bar in certain position adapted to engage any one of said notches with the reciprocal movement of said bar.

2. In a vehicle signalling apparatus, a supporting member, provided with a horizontal groove therein, a cover member secured thereto with a conforming groove therein, a bar reciprocably mounted in said grooves provided with a plurality of equally spaced notches and with an extended lug on its one end, an arm member pivotally mounted on said lug and supported between said support and said cover member at one of its ends, a latch means for holding said bar in certain position adapted to engage any one of said notches with the reciprocal movement of said bar, and a lug member secured to said cover member reciprocally mounted in a slot in said arm member for controlling the movement of said arm member and holding it from vibrating when it is hanging in a vertical position.

3. A vehicle signalling apparatus, including a pair of supporting members secured together, each provided with conforming aligned horizontal grooves, a bar reciprocably mounted in said grooves provided with a plurality of notches therein and an extended lug on its one end, an arm member pivotally mounted on said lug and supported between said supporting members provided with a groove in said arm adapted to engage a pin on one of said supporting members for controlling the movement of said arm and for holding it from vibrating when hanging in a vertical position and a yieldable latch member supported in said support adapted to engage any of the notches in said bar for holding said bar in certain position in said supporting member thereby holding said arm member in varying positions as desired.

In testimony whereof, I have hereunto set my hand at San Diego, California, this 29th day of August, 1919.

JOSEPH W. BRENKERT.